Nov. 28, 1961 R. C. OELER ET AL 3,011,017

CONTROL APPARATUS

Filed Dec. 3, 1956 3 Sheets-Sheet 1

INVENTORS.
Richard C. Oeler,
BY Bernard S. Parmet
Mueller and Aichele
Attys.

INVENTORS.
Richard C. Oeler
BY Bernard S. Parmet,
Mueller and Aichele
Att'ys.

CONTROL APPARATUS

Filed Dec. 3, 1956

INVENTORS.
Richard C. Oeler,
Bernard S. Parmet,
BY Mueller and Aichele
Attys.

United States Patent Office 3,011,017

Patented Nov. 28, 1961

3,011,017

CONTROL APPARATUS

Richard C. Oeler, Elmhurst, and Bernard S. Parmet, Elmwood Park, Ill., assignors to Motorola, Inc., Chicago, Ill., a corporation of Illinois Filed Dec. 3, 1956, Ser. No. 625,717
2 Claims. (Cl. 178—5.8)

This invention relates to control systems for wave signal receivers and more particularly to remote control apparatus for television receivers.

In many cases, it is desirable to control one or more of the adjustments of a wave signal receiver from a remote position, for example from the chair occupied by a user of the device. This is particularly true of television receivers because a viewer normally sits many feet from the set and its various controls. Thus there is great convenience in providing remote adjustment of the power switch and the channel selector of such a set, so that one may remain in a suitable viewing position while selecting a particular station or turning the set on and off. Furthermore, in many cases changing channels also requires alteration of the picture contrast, and, reception of different programs may well necessitate different settings of the sound volume so that additional controls for these functions may be desirable as remote adjustments.

It may also be noted that any remote channel selection apparatus, to have general application in many parts of the country, should be capable of tuning a complete range of channels, for example 2 through 13. However, a viewer in any given area would desire to tune only particular channels which are available in the area and automatic apparatus should be easily adjustable to select only certain channels without complicated and costly modification or circuit alteration within the receiver.

Remote control systems for one or more responses of a television receiver have been devised in the past but these have generally been of comparatively expensive and complex construction. In addition such systems have generally not been simple to set for tuning only the desired ones of the channels received in a given area.

Accordingly, it is an object of the present invention to provide a simple, remotely controlled motor-driven channel selector for a television receiver.

A further object is to provide such a remote channel selector for a television receiver which can be easily adjusted from the back of the receiver to select automatically only desired channels when the motor is operated.

Another object is to provide an improved and simplified remote control device for a television receiver which permits convenient adjustment of the receiver volume, contrast, station selector, and on-off switch of the receiver.

Still another object of the invention is to provide an improved remote control device for a television receiver which automatically silences the sound and blanks out the picture of the receiver during automatic selection of a channel by the apparatus.

A feature of the invention is the provision of a motor driven television channel selector having an index wheel which carries pivotally mounted cams individually associated with each TV channel and movable to an operative or an inoperative position by one of a pair of slidable rods available at the back panel of the receiver so that desired ones of the cams can be positioned to open a switch and stop the motor.

Another feature is the provision of such a motor-driven channel selector wherein a de-clutching rotor of the motor operates upon energization of the motor to close a switch and apply a positive potential to the cathode of the picture tube to blank out the image thereof and further to ground the final audio amplifier tube to silence the sound from the receiver, all to prevent annoying picture and sound conditions while tuning between stations.

A further feature of the invention is the provision of remote control apparatus for control of a television receiver including a three-wire remote switch circuit cooperating with an on-off switch of the receiver for local or remote control of energizing power to the set, a remote tuning motor control switch, a variable resistor for control of audio applied to the receiver speaker, and a variable resistor in the cathode bias circuit of the video amplifier tube for controlling the contrast of the image produced by the picture tube.

Further objects, features and the attending advantages of the invention will be apparent upon consideration of the following description when taken in conjunction with the accompanying drawings in which.

The invention provides a remote control system for a television receiver including an electric motor to drive the tuner of the receiver and a remote switch to cause energization of the motor. The motor is de-energized when a desired channel is selected, as a cam pawl engages and opens a further motor control switch. A plurality of such pawls is mounted on an index wheel rotatable with the tuner and one such pawl is associated with each channel tuned by the apparatus. Each cam pawl can be locked in a position to engage the control switch as the index wheel reaches a given position and the channel is tuned, or to pass the switch without engaging the same so that only desired channels are selected. The pawls can easily be set in either of these positions from the rear of the receiver, by operating one of a pair of slidable rods engageable with the pawl associated with the channel to which the apparatus is tuned. The remote control system further includes switch apparatus associated with the motor and operated when the motor is energized to ground the audio system of the receiver and silence the sound therefrom and to bias to cut off the cathode ray picture tube thus blanking out the picture during channel selection. The remote switch for controlling the tuning motor may also be mounted together with an on-off switch for controlling power to the receiver and may further be incorporated with a variable resistor coupled to the audio system of the receiver to control volume and an additional variable resistor coupled to the video amplifier of the receiver for regulating the gain and thus the contrast of the picture. Accordingly, the various adjustments most often operated in the normal course of using a television receiver are made available for remote operation of the various receiver controls.

Figures 1, 8:
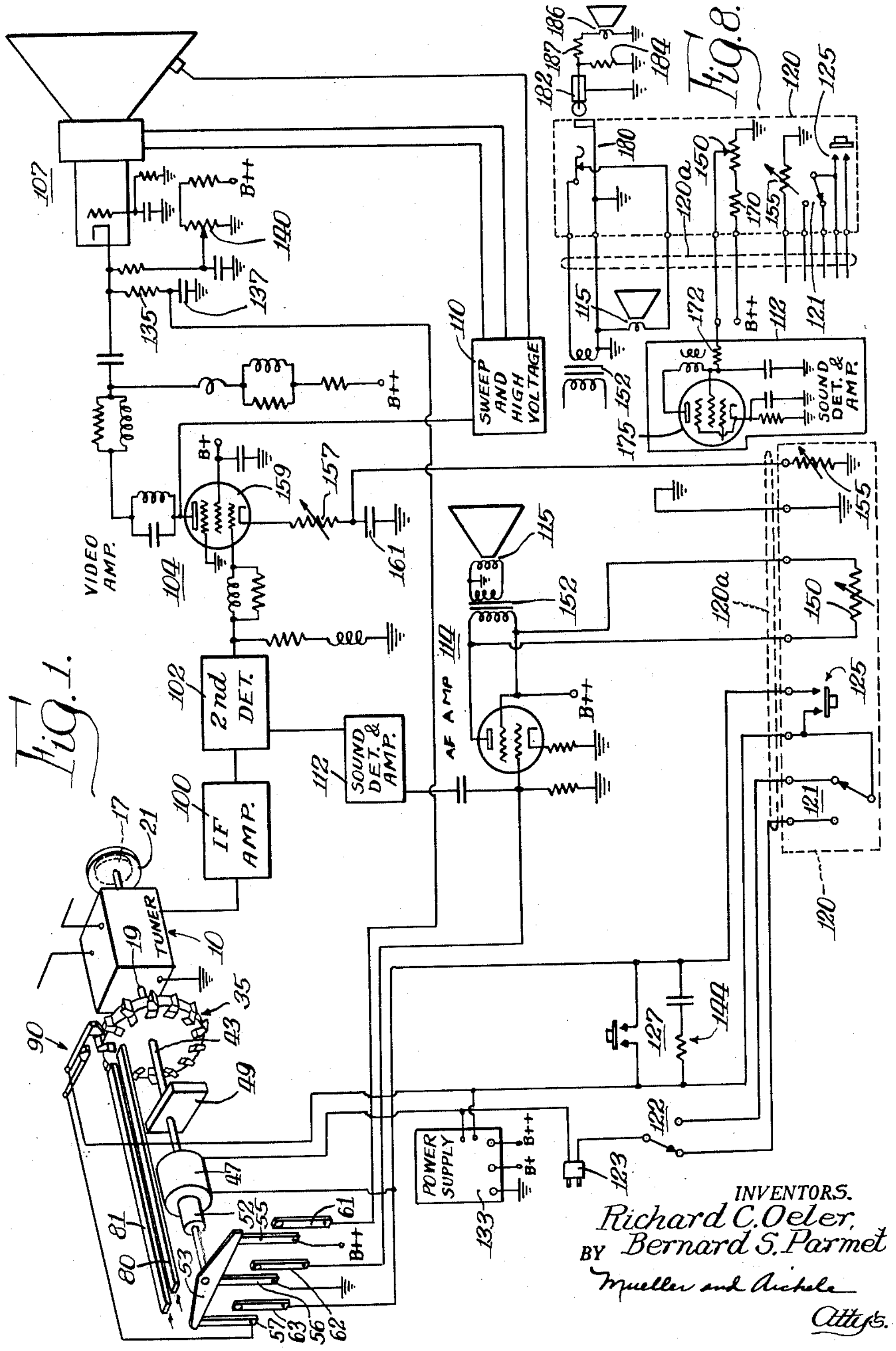
FIG. 1 is a schematic diagram of a television receiver incorporating the remote control apparatus of the invention.
FIG. 8 is a modified form of a portion of the circuit of FIG. 1.
Figures 2, 3:
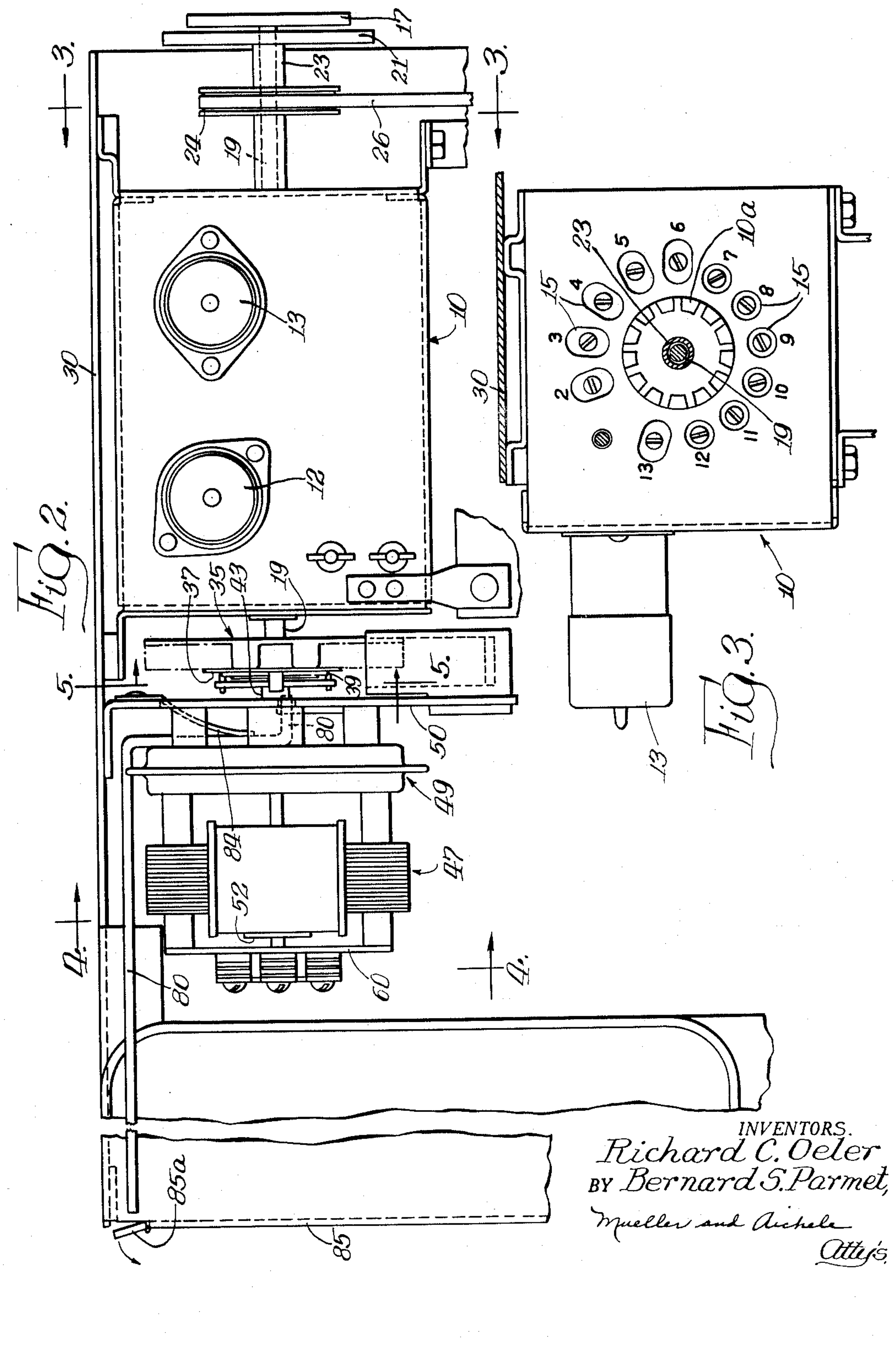
FIG. 2 is a side elevational view of the automatic tuning apparatus of the invention.
FIG. 3 is a front elevational view along the line 3—3 of FIG. 2.

Considering now the control apparatus in greater detail, FIGS. 1–3 show the television channel selecting tuner 10 which includes a detenting type switch (a portion being shown in FIG. 3 as detent disc 10*a*) having 13 positions each of which couples the proper tuned circuit to the remaining receiver circuit to select a particular channel.

This tuner unit includes vacuum tubes 12 and 13 which serve as radio frequency amplifier and mixer-oscillator, respectively. The necessary circuit elements for these tubes to function may be included within the enclosure of the tuner 10 in accordance with known practices in the art. Through openings 15 provided in the front of the enclosure for the tuner various oscillator alignment adjustments are available in order to precisely tune the apparatus to each of the television channels. A manual selector knob 17 for rotating the shaft 19 of the 13 position switch is available from the front of the receiver. A knob 21 is also provided concentric with knob 17 for fine tuning purposes, the mechanism for which is not shown. This knob rotates sleeve 23 disposed about shaft 19. Sleeve 23 also rotates a gear 24 which may be coupled by means of a chain drive 26 to a UHF tuner (not shown) in order to tune additional television channels not covered by the tuner 10.

In the tuning apparatus being described, the tuner 10 is supported by the top of chassis 30 which may be in the upper portion of the receiver cabinet (not shown) to place the tuning knobs 17 and 21 conveniently in the upper right corner of the cabinet.

An extension of shaft 19 projects the rear of the tuner 10 and affixed to this projection is the index wheel 35, the cam spring 37 and the washer 39. These components are shown more clearly in FIGS. 5 and 6. The washer 39 includes projections extending parallel to the axis of shaft 19 and these projections engage notches in the rim of disc 41 which is affixed to shaft 43. An electric motor 47, of the shaded pole type, and gear reduction unit 49 are mounted together in bracket 50 supported by the top of chassis 30. Motor 47 is adapted to drive the shaft 43 through the gear reduction unit 49 at a speed of approximately 12 r.p.m. which drives the tuning apparatus to its different positions. The construction of washer 39 and disc 41 simplifies the assembly operation and obviates precise alignment of shafts 19 and 43.

Figure 4:
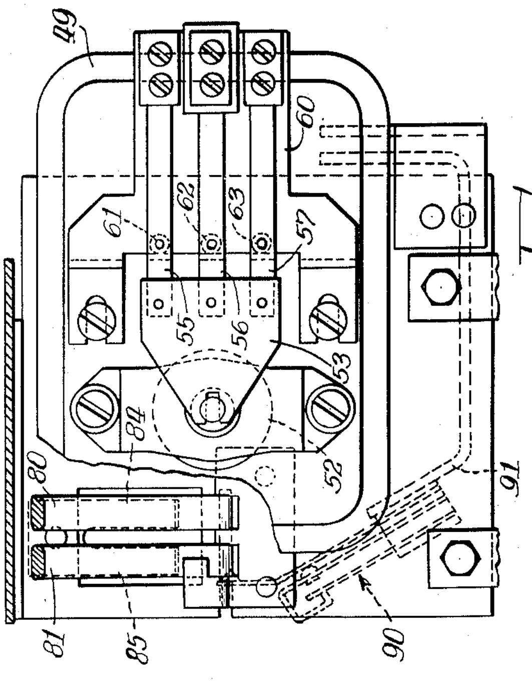
FIG. 4 is a rear elevational view along the line 4—4 of FIG. 2.

The armature 52 of motor 47 (FIG. 4) is spring biased outwardly from the gear reduction unit 49 by means of the insulator plate 53 which is joined to the spring strips 55, 56 and 57, the other ends of which are insulated and fastened to motor 47 by bracket 60. When power is applied to the motor, however, the rotor is drawn inwardly against this spring biasing so that it engages the unit 49 and operates shaft 43. By disengaging or de-clutching the rotor of motor 47 in this manner, there is less drag or resistance to manual operation of the tuner when knob 17 is used. The spring strips 55–57 are also insulated from one another and in the inward position of rotor 52, these engage respectively fixed contacts 61, 62 and 63 to provide three separate switches which are closed when the motor is energized. As will be explained in connection with the circuits, these switches silence the sound from the receiver, blank out the picture, and provide the function of a holding relay so that operation of the controlling push button may be momentary during the automatic tuning operation.

Figures 5, 6:
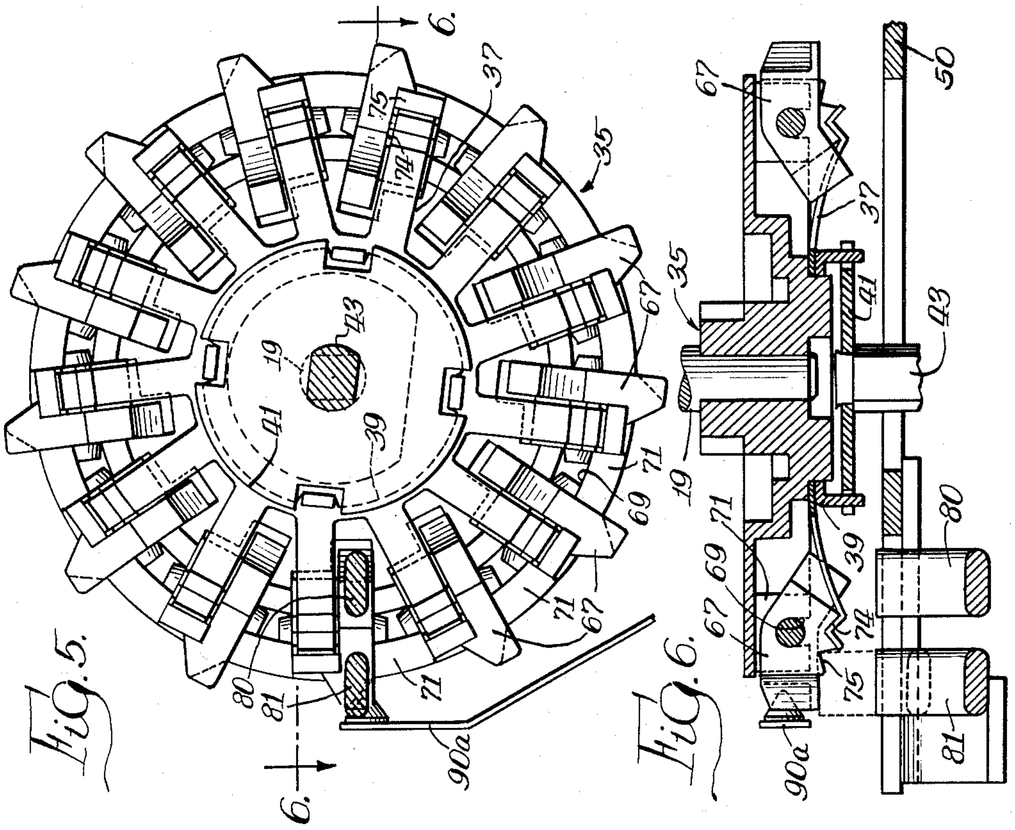
FIG. 5 is a sectional view along the line 5—5 of FIG. 2.
FIG. 6 is a sectional view along the line 6—6 of FIG. 5.
Figure 7:
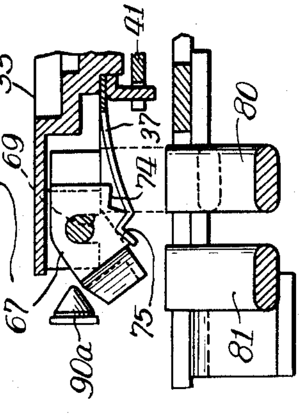
FIG. 7 is a fragmentary view of the apparatus of FIG. 6 when adjusted to a different setting.

As shown in FIGS. 5, 6 and 7 index wheel 35 carries a plurality of identical cam pawls 67, one associated with each television channel tuned by the tuner 10. The pawls are pivotally supported in grooves 69 in outward projections 71 on the rearwardly facing surface of wheel 35. Each pawl is V-shaped and has a pivot at the junction of the arms of the V and the pivot for each pawl is supported in grooves 69. The pawls are held in place by arms of cam spring 37 each of which engage one of two notches in the pawls. As shown in FIG. 6 the outer arm of a pawl may extend in the plane of, and beyond the rim of index wheel 35 with the inner arm of the pawl extending outwardly from the plane of the wheel. In this position the cam spring 37 engages notch 74 of the pawl so that the pawl is fixed with respect to the index wheel. As shown in FIG. 7 the pawl may also be locked in a position with the outer arm thereof extending away from the plane of wheel 35 and the inner arm thereof positioned in the plane of the wheel. The pawl may also be locked in this position with spring 37 engaging notch 75 of the pawl.

Slidable rods 80 and 81 extend along the top of chassis 30 of the receiver and are available through door 85a as shown in FIG. 2. Alternatively the rods may be made available at the rear of the receiver when the back panel has been removed. Ordinarily this would involve only removing a few holding screws which would not be inconvenient on the occasions when changes in desired channels are made. The rods 80, 81 are further formed to extend downwardly at the forward side of the gear reduction unit 49 and then parallel to the axis of the shaft 19 so that rod 81 is aligned with the outer arm of pawl 67 and arm 80 is aligned with the inner arm of this pawl as shown in FIGS. 6 and 7. The rods 80, 81 are aligned with any one of the pawls which is positioned nearest the left side of the unit as seen in FIG. 3. This positions these rods so as to reduce the possibility of interfering with other components of the television receiver. The slidable rods 80, 81 are held in a retracted position by means of springs 84, 85 affixed to bracket 50.

A switch 90 is supported adjacent the index wheel 35 by means of bracket 91 and this switch includes an operating arm 90a which is positioned to be engaged by the pawl which is aligned with rods 80, 81. The end of the outer arm of each pawl is beveled so that it will smoothly engage switch arm 90a as the wheel rotates if the outer arm of the pawl is positioned in the plane of the index wheel 35 as shown in FIG. 6 and so that the pawl may be more easily set by rod 81 (which opens switch 90). If the pawl has been positioned as shown in FIG. 7, with the inner arm thereof in the plane of wheel 35, the pawl will merely pass the switch arm 90a without engaging the same. As will be explained in connection with the circuit diagram, switch 90 is connected in the circuit for motor 47 to de-energize this motor and stop the tuner. Accordingly, it may be seen that by initially setting the tuner to each of the positions thereof by means of knob 17, rod 80 may be operated to position the pawls so that the automatic apparatus will not stop at the associated channel, or alternatively, rod 81 may be operated to position the pawls so that the channel will be selected by the apparatus during automatic tuning. Therefore, with each of the pawls 67 so positioned operation of motor 47 will cause the switch of the tuner 10 to be driven until the first channel is detented having a pawl positioned to stop the motor. Again, operating the motor would drive the tuner to the next selected channel and so forth with the process repeating when the detening switch of the tuner has made a complete revolution.

Reference will again be made to FIG. 1 which is a schematic diagram of the remote control apparatus of the invention. Shown here is the tuner 10 coupled to the intermediate frequency amplifier 100 which is connected to the second detector 102. The second detector is coupled to a video amplifier 104 which applies the television picture signals between the cathode and control grid of the cathode ray picture tube 107. Amplifier 104 is also coupled to the sweep and high voltage circuit 110 which provides deflection signals for tube 107 as well as a high voltage for the anode thereof, as customary in the art. Second detector 102 is also connected to the sound detector and amplifier 112 which demodulates the frequency modulation sound and applies the audio signal to the final audio frequency amplifier 114. This signal is then applied to loudspeaker 115.

Several of the controls of the receiver are adjustable from the control box 120 which may be connected to the receiver by means of a multiconductor cable 120a from a position remote from the receiver itself. Control box 120 includes a single pole double throw on-off switch 121 which, together with a further on-off switch 122 located at the receiver, cooperate in a three wire switch circuit to supply power for the receiver from plug 123 which may be connected to the 110 volt lines. Switch 125 is provided for remote operation of the tuner motor 47, and this is connected in parallel with a similar switch 127 located on the receiver itself so that either switch may be operated to start the tuning motor.

When the motor is energized, the switch formed by strip 55 and fixed contact 61 is closed and this supplies a high voltage direct current (B++) from the power supply 133 and through resistor 135 to the cathode of the picture tube 107. The fixed contact 61 is bypassed to ground by capacitor 137. It may be noted that the cathode of tube 107 is normally operated at a potential somewhat less than B++ as determined by the setting of brightness control 140. However, when motor 47 is energized a high positive potential is placed on the cathode which cuts off conduction of tube 107, the grid of which is operated at approximately ground potential, so that the screen of the tube will be blanked out, or darkened.

It may also be seen that spring strip 56 will engage fixed contact 62 when the motor is energized and that this will directly ground the control grid of the final audio frequency amplifier tube in amplifier circuit 114 thereby silencing sound from the receiver. This, of course, insures that no annoying sounds will be emitted during the tuning operation.

It is contemplated that an operator, upon using switch 125 or switch 127 to start the tuning motor 47, will release the switch and that thereafter the motor will provide its own energizing circuit until the next channel has been selected. Accordingly, one terminal of motor 47 is directly connected to plug 123 and the other terminal of the motor is coupled through contact 63 and spring strip 57 (which will be closed when the motor has been initially energized through operation of either switch 125 or switch 127) and the contacts of switch 90, which will be closed if the pawl associated with a desired channel is not engaging the operating arm of the switch, and through the circuit completed by the on-off switches 121 and 122 to the other terminal of plug 123. The contacts of switches 90 and 57, 63 as well as those of 127 are interconnected through a series RC circuit 144 to reduce sparking. The reason for including the switch 57, 63 is so that during manual operation of the receiver by tuning knob 17 (FIG. 1) the tuning motor 47 will not be operated when the tuner is positioned to various channels for which the pawls have not been set to open switch 90. In other words, this prevents operation of the automatic circuit when one is tuning manually and also acts as holding switch when switches 27 or 25 have been released.

It should be noted that a user may merely depress and release switch 125 and that the apparatus will automatically tune the next channel for which a cam pawl has been set. If this is not the desired channel, switch 125 may again be operated until the desired channel has been selected. It is also possible to hold switch 125 closed in which case the motor will continuously operate until switch 125 is released and switch 90 is opened by the next set cam pawl. The apparatus may further include a channel indicator driven by shaft 19 (FIG. 2) and having large numerals visible from a normal television viewing distance so that one may be advised of the channel to which the receiver is tuned from the remote position of the control box 120.

Since it is frequently useful to regulate audio volume during use of a television receiver, control box 120 includes a variable resistor 150 which is connected across the primary of output transformer 152 to regulate the audio signal applied to speaker 115. Under some circumstances it may also be desirable to adjust the contrast of the television picture and variable resistor 155 is also included in the control box for this purpose. This resistor is connected between ground and one side of variable resistor 157, the other side of which is connected to the cathode of the video amplifier tube 159. The junction of resistors 155 and 157 is bypassed to ground at signal frequencies by capacitor 161. Variation of resistor 155 will alter the cathode potential of tube 159 and thus change the gain of this tube to vary the strength of the signal applied to the picture tube, that is, to vary the contrast of the reproduced image. Control 155 will be effective to produce a contrast as great as the setting permitted by the adjustment of variable resistor 157 or any contrast lesser than this. Accordingly, control 157 may be set at greater than desired contrast and this can be reduced to a proper level through the setting of variable resistor 155.

It should further be pointed out that in the event the remote control box 120 is not used under particular circumstances, jumper wires may be connected, in place of variable resistors 150 and 155 and between the lead common to switches 121 and 125 and either of the remaining leads of switch 121. Under such conditions, picture contrast would be controlled entirely by variable resistor 157 and audio volume could be set by a variable resistor (not shown) incorporated in circuit 112. Obviously, the tuning motor will be operated only by switch 127 and the power to the entire receiver would be regulated only by switch 122.

FIG. 8 shows a modification of the remote control circuit for the receiver of FIG. 1. In this embodiment the control box 120 includes variable resistor 150 which is adapted to control the volume of the receiver in a different manner. In this form the fixed portion of resistor 150 is series coupled with resistor 170 between ground and B++. The movable arm of resistor 150 is connected through resistor 172 to the screen grid and the anode of vacuum tube 175 which comprises a sound intermediate frequency amplifier in circuit 112. Accordingly, variation of resistor 150 will control the screen and anode potentials on tube 175, thus regulating the amplitude of the sound signal which is subsequently detected and applied to the audio frequency amplifier and speaker 115.

Control box 120 further includes a switch type jack 180 which may be used for coupling a remote speaker to the receiver and disconnecting speaker 115 associated with the receiver in its cabinet. When a plug is not inserted in jack 180 the circuit is completed through cable **120*a* to speaker 115 so that operation in the usual manner takes place. However, when plug 182 is inserted, the connection to speaker 115 is broken and the secondary of output transformer 152 is coupled across resistor 184 which provides impedance matching. A second speaker 186 is series coupled with resistor 187 across resistor 184 and it is contemplated that speaker 186 be a small speaker for listening by one or two individuals without disturbing other nearby persons. Resistor 187 is used to reduce the signal applied to this speaker so that it will not be overdriven. It may be noted that the speaker coupling system is connected in the low impedance secondary circuit of transformer 152** in order to reduce hum pick up and that a desirable impedance matching network has been provided for improved operation.

This invention provides therfore remote control apparatus for a television receiver which is of comparatively simple construction and which provides adjustment of the settings most often used in operating such a receiver. Furthermore, the automatic tuning apparatus of the device may be set from the back panel of the receiver so that only desired channels are selected by the tuner of the receiver. There is no need to make complicated circuit changes or even to remove the back panel of the receiver in order to set up the tuner as desired when a receiver is delivered to a user or when a user wishes to change the selected channels at any later time. Furthermore, the control apparatus of the invention incorporates the various desired features of silencing the sound and blanking out the television picture during the automatic tuning operation so that there will be no annoying spurious responses at such time.

We claim:

1. In a television receiver having a housing, a manually operated detenting channel selector, power supply means, a sound system and a video system with a cathode ray tube therein, the remote control system for adjusting such receiver including in combination, an electric motor adapted to drive the channel selector, an index wheel driven by said motor and having index portions associated with given channels and positioned to project outwardly therefrom, first switch means positioned adjacent said index wheel to be opened by one of said index portions when said channel selector is tuned to a desired channel, means for mounting said index portions in fixed positions so that the same are rotatable into and out of switch engaging positions, slidable means engageable individually with said index portions and operable from the exterior of said housing for setting the positions thereof, circuit means coupled to the sound system and to the video system, second switch means operated in response to energization of said motor and including a first switch section connected to said circuit means for disabling the sound system and a second switch section connected to said circuit means to disable the video system, said second switch means further including a third section, further circuit means coupling the power supply means and said first switch means and said motor and said third switch section all in series, said further circuit means including third switch means adapted to be controlled remotely from the television receiver and to be momentarily operated, means coupling said third switch means in parallel with said first switch means and said third section of said second switch means, said first switch means being opened by engagement thereof with an index portion to de-energize said motor so that the channel selector stops on a desired channel, and said third section of said second switch means preventing operation of said motor upon manual operation of the channel selector and closure of said first switch means.

2. In a television receiver having a housing, a detenting channel selector, power supply means, a sound system and a video system, the automatic control system for adjusting such receiver including in combination, an electric motor adapted to drive the channel selector, an index wheel driven by said motor and having index cams individually associated with given channels and positioned to project outwardly therefrom, first switch means positioned adjacent said index wheel to be opened by one of said index cams when said channel selector is tuned to a desired channel, said index cams being rotatable into and out of switch engaging positions, spring biased manually slidable adjusting means engageable individually with said index cams and operable from the exterior of said housing for setting the positions thereof, an audio signal coupling circuit in the sound system, a cathode ray tube in the video system having an input electrode, a direct current bias circuit connected to said input electrode of said cathode ray tube for biasing the same with a potential from the power supply means, second switch means operated in response to energization of said motor and including a first switch section connected to said coupling circuit for shunting the same to a reference point to mute the sound in the receiver and a second switch section connected to said bias circuit to apply a cut-off potential to said input electrode to blank the picture in said cathode ray tube, third switch means adapted to be manually operated at said receiver, fourth switch means adapted to be operated remotely from said receiver, an energization circuit for said motor extending through each of said first, third and fourth switch means to said power supply means so that individual operation of said third and fourth switch means will energize said motor and said motor will remain operative with the sound muted and the picture blanked in said receiver until said first switch means is opened by an index cam.

References Cited in the file of this patent

UNITED STATES PATENTS

| | | |
|---|---|---|
| 2,083,722 | La Via | June 15, 1937 |
| 2,096,072 | Spagnola | Oct. 19, 1937 |
| 2,163,864 | Bissell | June 27, 1939 |
| 2,285,043 | Messner | June 2, 1942 |
| 2,812,486 | Foster | Nov. 5, 1957 |
| 2,833,976 | Kennedy | May 6, 1958 |

OTHER REFERENCES

Rider Television Manual, vol. 8, Philco, page 8–2. (Copy in Scientific Library.)

Philco RC–1 Remote Control Unit, Rider Television Manual, volume 8, Philco TV, page 8–1. (Copy in Div. 41.)

"Radio and Television News," November 1955, pages 46–48. (Copy in U.S. Patent Office Library.)